March 15, 1938.　　　A. W. TONDREAU　　　2,111,012
CAMERA SUPPORT
Filed Sept. 21, 1934　　　2 Sheets-Sheet 2
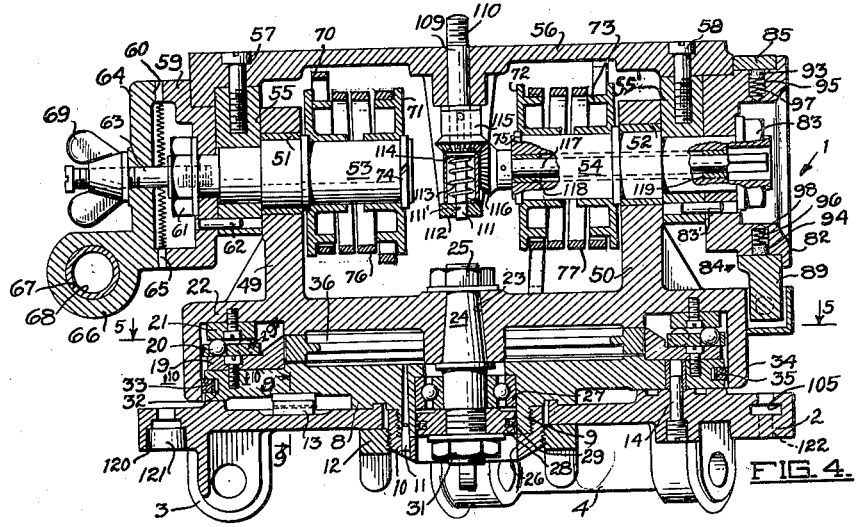
INVENTOR.
ALBERT W. TONDREAU
BY W. E. Beatty
ATTORNEY.

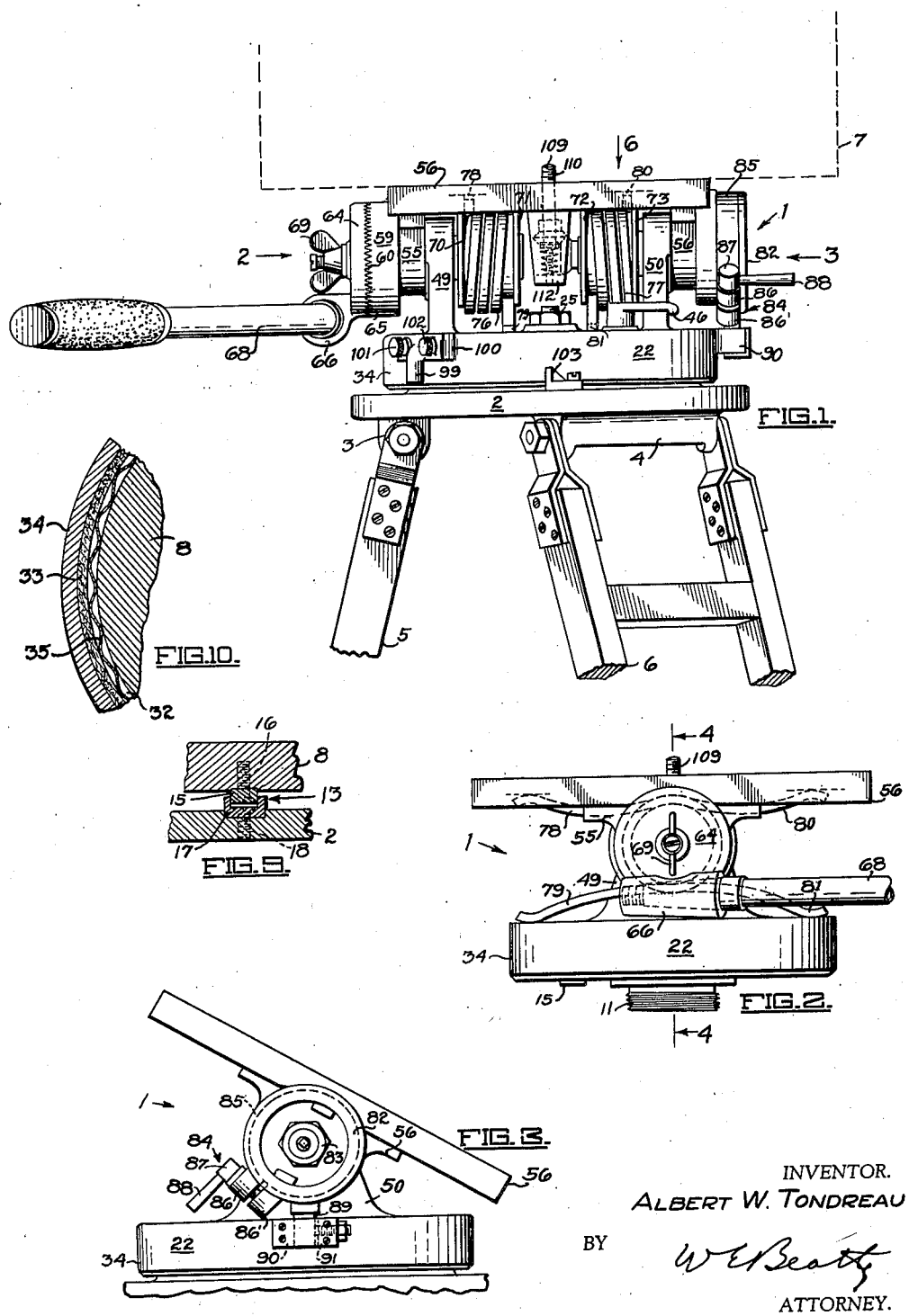

Patented Mar. 15, 1938

2,111,012

UNITED STATES PATENT OFFICE 2,111,012

CAMERA SUPPORT

Albert W. Tondreau, Hollywood, Calif., assignor to United Research Corporation, Long Island City, N. Y., a corporation of Delaware Application September 21, 1934, Serial No. 744,952

5 Claims. (Cl. 248—183)

This invention relates to supports for motion picture cameras and like apparatus, and particularly to supports of the type which permit the camera to be moved about two axes at right angles to each other.

Since the advent of "talkie" pictures, the moving picture camera has become a fairly heavy and cumbersome affair due to the addition of the "blimp" or sound-proof housing encasing it; the entire unit weighing, in some cases, 150 pounds or more. Due to the fact that the center of gravity is a considerable distance above the center of support, it will be seen that the camera is very unwieldy, especially when rotated about a horizontal axis.

It therfore becomes one object of my invention to resiliently counterbalance a motion picture camera and its accompanying blimp so that the camera will normally tend to return to a horizontal position when rotated about its horizontal axis.

This is accomplished by providing torsional springs mounted in axial alignment with the horizontal axis of camera support and having their ends oppositely interposed between the base and the rotatable camera plate. When these springs are flexed, there is relative movement between the end turns of each spring, due to the fact that one end of the spring is stationary with respect to the free head while the other end is flexed as the camera plate is tilted. In order to prevent this relative movement of the end turns of the spring from cutting their support, I provide independently rotatable spool heads or supports for each end turn of each spring.

Another object of my invention is to adjustably support the operating handle bar in any angular position relative to the camera.

This is accomplished by providing the handle mounting with a circular serrated face adapted to engage a similar face provided on a member attached to the movable camera plate. A locking nut is provided to lock the handle in any desired position relative to the camera plate.

A still further object of my invention is to adjustably limit the travel of the camera about its vertical axis. This is accomplished by providing a pair of stops adapted to be locked in position at any point on a circular track provided on the tripod head. A stop member attached to the movable camera base is adapted to strike one or the other of the adjustable stops thereby limiting the travel of the camera.

A still further object of my invention is to provide a smoother and more uniform adjustable braking control of the camera about its vertical axis.

This is accomplished by providing a pair of semi-circular brake shoes pivotally mounted to a base member at one of their ends and engaged at their other ends by a brake operating lever.

A still further object of the invention is to provide a smoother and more uniform constant or fixed braking control of the camera about its vertical axis.

This is accomplished by providing a spring pressed friction member such as a felt washer at the periphery of a stationary part of the free head and engaging a circular flange on the rotatable part of the free head. This gives a smoother constant braking effect than is possible with certain arrangements where the viscosity of grease is employed for this purpose. Preferably, this friction ring is located below a ball bearing support for the free head and in this location it serves to prevent leakage of lubricant from the ball bearing and also to prevent the entrance to the ball bearing of dirt from the exterior of the free head.

The invention further relates to an improvement in the means employed for operating the spring pressed bolt which extends through the top of the free head for locking engagement with the camera. Heretofore the operating shaft for this bolt has been mounted in such a position that it is only possible to rotate this shaft through a small angle, making it necessary to engage the crank several times with this operating shaft in order to turn the locking bolt the necessary amount. A further object of the invention is to avoid this restricted movement of the operating shaft, without interfering with the tilting movement of the camera plate. This is accomplished by positioning the operating shaft co-axially with the horizontal axis about which the camera plate is tiltable. Bevel gears between the operating shaft and the lock bolt permit unrestricted tilting movement of the camera plate.

Referring to the drawings, Fig. 1 is a front elevation of the camera support or free head mounted in position on a tripod.

Fig. 2 is a side elevation of the free head of Fig. 1, looking in the direction of the arrow marked 2.

Fig. 3 is a side elevation of the free head of Fig. 1, looking in the direction of the arrow marked 3, the camera plate being shown in a tilted position.

Fig. 4 is a sectional elevation on line 4—4 of Fig. 2.

Fig. 5 is a sectional plan view on line 5—5 of Fig. 4.

Fig. 6 is a plan view looking in the direction of the arrow marked 6 in Fig. 1.

Fig. 7 is a sectional view on line 7—7 of Fig. 6.

Fig. 8 is a sectional view on line 8—8 of Fig. 6.

Fig. 9 is a sectional view on line 9—9 of Fig. 4.

Fig. 10 is a sectional view on line 10—10 of Fig. 4.

Referring to Fig. 1, the camera support or free head, generally indicated by reference 1, is shown as being supported upon a tripod head 2 which has depending lugs 3 and 4 adapted to be secured to the upper portions of tripod legs 5 and 6. The upper part of the camera support 1 is adapted to carry a camera and its surrounding sound-proof casing as shown in the dotted lines 7.

Referring now to Fig. 4, the camera support 1 comprises a stationary base plate 8 having a central hub portion 9 which is threadably mounted within an adapter 10. A dowel pin 11 is provided to hold the adapter rigid with the base member 8. The lower end portion of the adapter 10 is provided with threads for threadable engagement with a clamping nut 12. In order to prevent rotation of the base 8 relatively to the tripod head 2, I may provide a tongue and groove arrangement 13 and a pin and slot arrangement 14. As the base member and also the tripod head are preferably made of a light metal such as aluminum, it is desirable to construct the tongue and groove 13 of a harder material, as steel, to prevent the edges from becoming burred. Referring to Fig. 9, it will be noted that the tongue 15 is mounted on the under surface of the base 8 as by a screw 16 while the groove member 17 is mounted to the tripod by a screw 18.

Referring again to Fig. 4, mounted on the upper surface of the base plate 8 is an annular member 19 the upper face of which serves as a race for ball bearings 20. Bearings 20 are rotatably held in spaced relation to each other by means of a bearing cage 20' slidably supported on the upper surface of member 19. The ball bearings 20 rotatably support a race member 21 secured to the under surface of a rotatable base member 22. Provided in the central portion of the rotatable member 22 is a tapered hole 23 in which is mounted a stub shaft 24 rigidly fastened therein by a nut 25. The lower end of the shaft 24 extends through an annular opening 26 provided in the base plate 8 and it carries a radial ball bearing 27 which serves to center the rotatable base member 22 on the base plate 8. A sealing member 28 is mounted on the shaft 24 immediately below the ball bearing 27 and has a groove 29 on its outer periphery which receives packing for the purpose of retaining lubricant in the bearing 27. A nut 31 retains the sealing member 28 in position on the shaft 24. Provided on the outer periphery of the base plate 8 is a groove 32 which carries a felt ring 33 adapted to engage the inner surface of a depending flange 34 provided on the outer edge of the rotatable base 22. A spring 35 of the "marcel" type is placed between the ring 33 and the inner surface of the groove 32 to provide initial friction between the base plate 8 and the rotatable base 22 so as to allow steadier movement of the camera when rotated about the vertical axis. The felt ring 33 is held stationary with respect to the base 8 by being wedged between the upper and lower surfaces of the groove 32. Thus, the slippage will be between the flange 34 and the outer surface of the felt ring 33. Lubricant may be interposed between these surfaces to prevent undue friction. It will be seen that in addition to providing initial friction between the base member 8 and the rotatable base 22, the ring 33 also serves as a seal to retain lubricant within the bearings 20 and also to exclude dirt from the exterior.

Referring now to Fig. 5, it will be seen that the inner surface of the annular member 19 is adapted to be engaged by a pair of semi-circular brake shoes 36 and 37 which are pivotally mounted at their ends 38 and 39 to the under surface of the rotatable base 22. The member 19 therefore serves the double function of supporting the bearings 20 and of forming a brake drum for the shoes 36 and 37. As will be seen in Fig. 7, the other ends 40 and 41 of the brake shoes 36 and 37 are tapered as at 42 and 43 and are engaged by the conical head 44 of a threaded shaft 45. The upper end of the shaft 45 is rigidly mounted in a brake operating lever 46. A bushing 47, provided in the base 22, is threadably engaged by the threaded portion of the shaft 45. It will therefore be seen that by rotating the lever 46, the shaft 45 and consequently the conical head 44 will be drawn up, tending to spread apart the brake shoes 36 and 37, thereby engaging the inner surface of the ring 19. Thus it will be seen that any amount of drag may be imposed between the camera support 1 and the tripod head 2 or they may be securely locked together preventing relative rotation. Referring again to Fig. 5, a tension spring 48 whose ends are mounted on projections 48a and 48b provided on the brake shoes 36 and 37 tend to hold the brake shoes in a contracted position out of engagement with the ring 19.

Referring to Fig. 4, mounted on the upper surface of the rotatable base 22 are a pair of standards or brackets 49 and 50 provided at the upper ends of which are bearings 51 and 52. Shafts 53 and 54, journaled in the bearings 51 and 52, are securely mounted in a second pair of brackets 55 and 55' provided adjacent the brackets 55 and 55'. The brackets 49 and 50 are secured at their upper portions to a camera plate 56 by screws 57 and 58. Mounted on the end of shaft 53 adjacent the bracket 55 is a circular casting or flange 59 having a serrated face 60. A nut 61 clamps the casting 59 on the shaft 53 and a dowel pin 62 is provided to prevent rotation of the casting 59 relatively to the bracket 55. A stud 63, one end of which is mounted in a threaded hole in the end of the shaft 53, carries a circular casting or flange 64 having a serrated face 65 corresponding to the face 60 of member 59. A lug 66 on the lower portion of the member 64 is provided with a socket 67 in which is mounted a handle bar 68. A thumb-screw 69 mounted on the end of the stud 63 is adapted to lock the two members 59 and 64 together. Thus it will be seen that the handle bar 68 may be rotated through a complete circle and locked in any desired angular position relative to the camera 7. This is advantageous when taking a picture at an angle with the horizon when it is desirable to maintain the handle bar 68 in a position which is comfortable to the operator. The handle 68 may also be dropped down in a vertical position when not required.

It will be seen in Fig. 4 that the inner end of the shaft 53 is provided with independently rotatable spool-shaped pieces 70 and 71, and shaft 54 is similarly provided with independently rotatable spool-shaped pieces 72 and 73. Split locking rings 74 and 75 mounted in grooves provided on the ends of shafts 53 and 54, respectively, retain the spool pieces 71 and 72 in longitudinal position. A torsional counter-balancing spring 76 is mounted over the spool-shaped pieces 70 and 71 and its ends are interposed between the upper surface of the base member 22 and the camera plate 56 as shown in Fig. 2 wherein the ends 78 and 79 of the spring 76 are shown as being mounted on one side of the center of camera plate 56. Spring 77 is similarly mounted on spool pieces 72 and 73 with the ends 80 and 81 thereof mounted on the other side of the center line. The end turns of the springs 76, 77 engage their respective rotatable supports 70, 71, 72 and 73 to avoid friction which would exist if a single support were provided for each spring. The springs 76 and 77 oppose each other and the strength of these springs is such that the camera plate 56, with the camera and its blimp thereon, returns or tends to return to a horizontal position.

Mounted on the outer end of shaft 54 is a circular casting 82 which is secured thereto by a nut 83. A dowel pin 83' prevents rotation of the casting 82 relatively to the bracket 55'. A brake generally indicated at 84 in Figs. 3 and 4, comprises a split band 85 having lugs 86 and 86' on the ends thereof. A clamping screw 87 provided with a brake operating handle 88 extends through a hole provided in the lug 86 and is threadably mounted in the lug 86'. A projecting lug 89 is provided on the lower portion of the brake band 85 which projects between a pair of lugs 90 and 91 provided on the base member 22 as seen in Fig. 3 for the purpose of holding the brake band 85 stationary. Thus it will be seen that by rotating the handle 88, the amount of friction between the brake band 85 and the member 82 may be varied or they may be locked securely together by tightening the brakes sufficiently. Referring to Fig. 4, the circular casting 82 is provided with lubricating pads 93 and 94 mounted in holes 95 and 96. Springs 97 and 98 hold the pads 93 and 94 in engagement with the inner surface of the brake band 85 and thereby lubricate the braking surfaces.

When taking panoramic pictures, it is desirable at times to provide stops to limit the angular travel of the camera about its vertical axis. For this purpose, as shown in Figs. 1, 5, 6, and 8, I provide a stop member 99 which is mounted on a boss 100 provided on the outer edge of the flange 34 of the rotatable base 22. Knurled thumbscrews 101 and 102 allow the stop 99 to be removed when not desired. A pair of adjustable stops 103 and 104 are provided on the surface of the tripod head 2 against which the stop 99 is adapted to strike, (see Fig. 5). The stops 103 and 104 are adapted to be securely held at any point along a T-shaped slot 105. It will be seen in Fig. 4 that an aperture 120 is provided below the slot 105 through which may be inserted a T-shaped clamping nut 106. After the nut 106 is placed within the slot 105, a plug 121 is inserted within the aperture 120 to prevent the nut 106 from catching therein. The stop 103 is L-shaped in construction and has an aperture provided in the rear portion thereof through which a screw 107 is inserted. The threaded end of the screw 107 is threadably received in the clamping nut 106. It will therefore be seen that by tightening the screw 107, the stop 103 may be securely locked in position. A projection 108 on the forward part of the stop 103 is guided within the slot 105 thereby preventing rotation of the stop 103 about the axis of the screw 107.

Holes 122, 123, 124, and 125 are provided within the tripod head 2 below the slot 105 and communicating therewith to allow dirt which may accumulate within the slot 105 to fall therethrough.

Referring to Figs. 1 and 4, in order to secure the camera 7 to the camera plate 56, I employ a bolt 109 having a threaded portion 110 extending above the camera plate 56. The lower end of the bolt 109 is provided with a reduced portion 111 mounted in a bearing 111' provided by a support 112 depending from the under surface of the camera plate 56. A spring 113 interposed between the shoulder 114 of the bolt 109 and the top of the bearing 111' tends to hold the bolt 109 in its uppermost position. A bevel gear 115 is mounted on the bolt 109 so as to allow the latter to slide vertically therein but at the same time to drive the bolt 109. The bevel gear 115 is engaged by a similar bevel gear 116 provided on the end of an operating shaft 117 which is journaled coaxially with the horizontal tilt axis of the free head in bearings 118 and 119 provided in a longitudinal opening within the shaft 54. The outer end of the operating shaft 117 is milled so as to be substantially square in cross section to receive the end of a crank (not shown). Thus it will be seen that when the camera is placed on the camera plate 56, the bolt 109 will be pressed under the surface of the plate 56 until the threaded hole in the camera lines up the threaded portion 110 of the bolt 109 thereby allowing the spring 113 to press that bolt into engagement therewith. The control shaft 117 may then be rotated as much as desired with a single engagement of the crank not shown. This causes the threaded portion 110 of the bolt 109 to thread into the aperture of the camera securing it thereto.

Having thus described the invention, what is claimed as new and desired to secure by Letters Patent, is:

1. A camera free head comprising a stationary base plate adapted to be fixed to a tripod head, a rotatable base plate, means for supporting said rotatable base plate on said stationary base for rotation about an upright axis, a camera plate, means on said rotatable base plate for supporting said camera plate for tilting movement about a horizontal tilt axis, a pair of helical springs having the axis thereof coaxial with said tilt axis and tending to return said camera plate and the camera thereon to a horizontal position, and independently rotatable supports for the end turns of each of said springs.

2. A camera free head comprising a rotatable base, a pair of brackets arising therefrom, bearings provided within each of said brackets, an axle in each of said bearings and extending on opposite sides of said brackets, a camera plate having depending portions in engagement with the outer ends of said axles respectively, a spring coil about the inner end of each of said axles, one end of each of said springs engaging the under side of said camera plate, the other ends of each of said springs engaging the top side of said rotatable base and a pair of independently rotatable supports for the end turns of each of said springs respectively, each pair of said supports being mounted on the inwardly projecting end of said axles respectively.

3. A camera free head comprising a camera plate, means for supporting said plate for tilting movement about a horizontal axis, a circular flange attached to and mounted adjacent said plate concentric with said axis and terminating laterally in serrations, a handle member having a circular flange terminating laterally in serrations, and means for retaining the serrations on said handle member flange in engagement with the serrations on said first mentioned flange.

4. A tripod head comprising a stationary horizontal base, said base having a circular groove concentric with the vertical axis thereof, a pair of stops adapted to be locked in any selected positions in said groove, and a free head having a base plate parallel with said stationary base plate and rotatable about said axis and having a fixed stop cooperating with said first mentioned stops to predetermine the limits of rotation of said free head.

5. In a camera free head, the combination of a camera plate, a lock bolt passing perpendicularly to said plate, a gear mounted on said bolt in sliding engagement therewith, spring means urging said bolt above said plate, and means for operating said gear comprising an operating shaft coaxial with the horizontal tilt axis of the free head and having a gear thereon adapted to mesh with said bolt gear.

ALBERT W. TONDREAU.